United States Patent Office 3,227,251
Patented Jan. 4, 1966

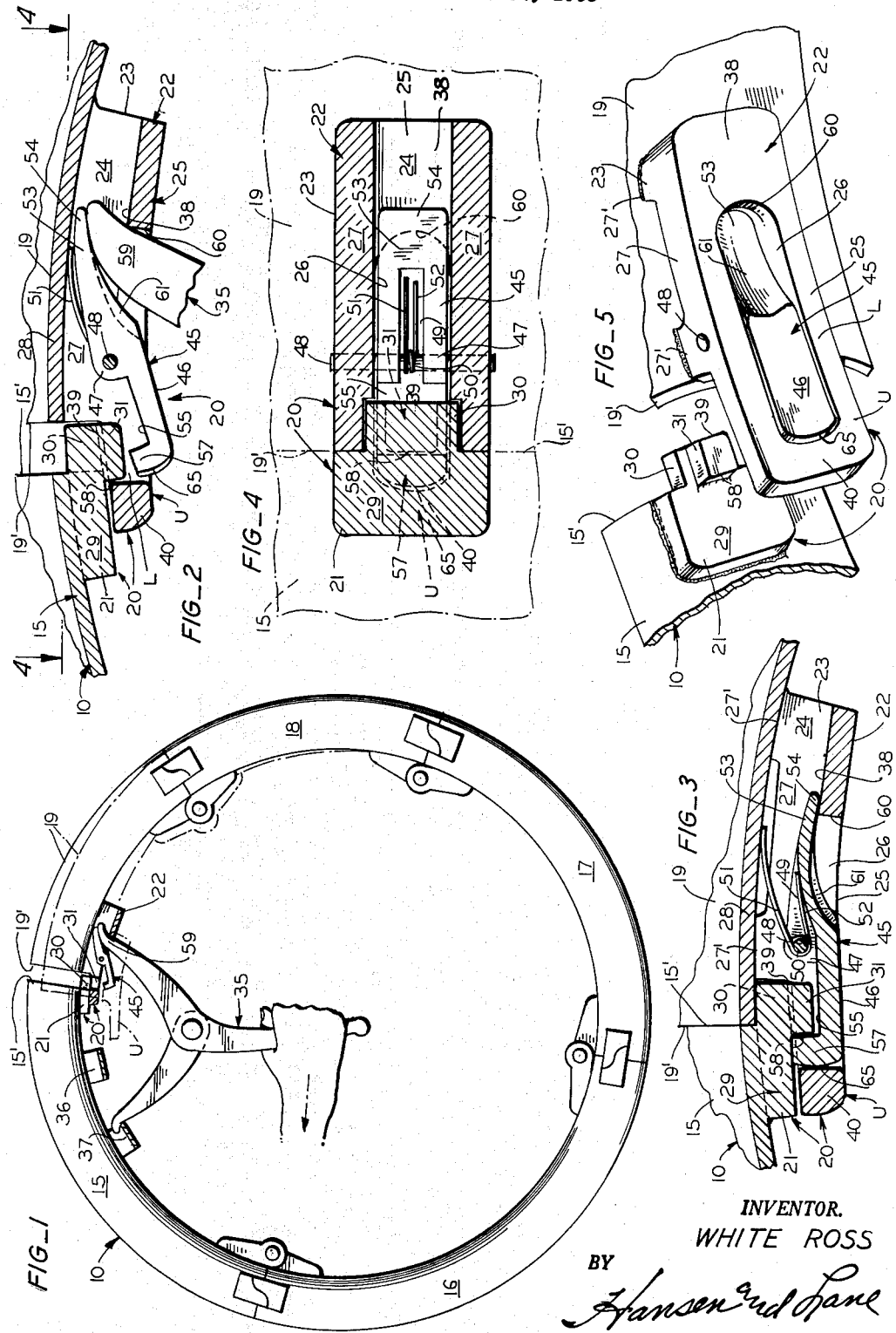

3,227,251
LATCH AND TOOL COMBINATION
FOR CURING RIM
White Ross, Hayward, Calif., assignor to Elrick Industries, Inc., Oakland, Calif.
Filed Jan. 14, 1963, Ser. No. 251,713
5 Claims. (Cl. 189—36)

This invention relates to collapsible curing rims and more particularly to a novel latch for such type curing rims.

In the art of retreading and/or recapping worn tires it is the practice to place the tire carcass within two half rim side walls joined to provide a conventional split matrix by which the tread design is impressed upon the new rubber during vulcanization thereof to the carcass. With the carcass so disposed an inflatable curing bag much like an inner tube is inserted into the carcass and backed up by a curing rim. Since the curing rim must be inserted after placement of the carcass and bag within the closed matrix it will be appreciated that an assemblable or a collapsible curing rim is most convenient. It is with collapsible curing rims of this nature that we are here concerned.

The present invention is embodied in a rim made of integrated segments collapsible into a compact unit, i.e., one which folds up into a size well within the orbit of the rim beads of the tire carcass which is to receive the curing rim. The invention herein concerns the provision of a novel securing means at the closing joint for a collapsible curing rim made up of a plurality of hingedly connected or integrated segments in which two unconnected terminal segments are so constructed as to readily align with each other and to be secured together.

The invention further contemplates a latch for securing segments of such a rim which latch automatically locks such terminal segments in aligned condition at the closing joint.

It is yet another object of the present invention to provide in a collapsible curing rim having an alignable matching pair of end abuttable terminal segments one of which is swingable toward the other and each of which has a portion which interfits with that of the other projecting from the abuttable ends of such segments requiring expansion of such rim in order for such portions to interfit with each other; a hand tool and latch combination in which the hand tool when detachably connected to such pair of terminal segments to expand such rim is effective to hold the latch unit in unlatching position until the terminal segments are aligned for abutting relation for interfitting of the projecting portions with each other and the latch unit automatically released upon withdrawal of the tool from the then closed rim.

In connection with the foregoing object it is a further object to provide such latch with a lever on one of such terminal segments normally spring urged into latching engagement with a keeper on the other one of such segments, the lever having one end adjacent a lug engageable by one arm of such tool for depression thereby during manipulation of the tool.

Since the terminal segments of the closing joint of hinged type curing rims are not such as to remain aligned at the abutting joint it is a further object of this invention to provide means for maintaining the meeting ends of the terminal segments in orbital alignment with each other.

It is a further object of this invention to provide novel interlocking latch halves on the terminal segments for securing them together once they are aligned with each other.

It is another object to provide interlocking halves of a closing joint with a latch for latching up slack in the spacing of abuttable portions of the interlocking halves for limiting opening of such closing joint other than during intentional connection and/or disconnection of such interlocking halves with each other. In connection with the foregoing object it is a further object to provide a latch which is operable by a rim spreading tool simultaneously with the rim spreading operation of the same.

It is yet another object of this invention to provide a hand tool and latch combination such that the tool when detachably connected to the abuttable rim sections first releases the latch unit and effects a separation of the abuttable sections of the rim.

It is yet another object of this invention to provide a latch constructed for combined action with a hand tool which when detachably connected to the abuttable rim segments to expand the rim and align such rim segments for abutting relation effects a release of the latch mechanism to enable interfitting alignment of overlapping portions on such abuttable rim segments.

These and other objects and advantages of the present invention will become apparent from a reading of the following description in the light of the drawings in which:

FIG. 1 is a side elevational view of a curing rim embodying the latch of the present invention.

FIG. 2 is an enlarged fragmentary section through the closing joint and latch as seen in FIG. 1.

FIG. 3 is a view similar to that of FIG. 2 with the latch shown in closing joint latching condition.

FIG. 4 is a horizontal section through the latch of FIG. 2 and taken substantially along line 4—4 thereof.

FIG. 5 is a perspective view of the closing joint rim segments about to be brought together.

Referring to FIG. 1 of the drawing a curing rim 10 is shown as being expanded by a rim operating lever or wrench 35.

The curing rim 10 embodying the present invention is shown in FIG. 1, as being made up of a plurality of segments 15, 16, 17, 18 and 19 each of which, except for the first and last, is hingedly connected to an adjacent segment. The first and last segments 15 and 19, hereinafter referred to as terminal segments, when aligned with each other come together at what is commonly known as a closing joint. The line of separation at the closing joint between segments 15 and 19 is the terminal edges 15′ and 19′ respectively thereof. These abuttable edges become radially disposed relative to the rim 10 when the latter is in opened annular condition. In order to maintain the rim 10 in opened condition and to prevent internal collapsing thereof at the closing joint, the two terminal segments must be secured together.

The present invention is concerned with an interlocking latch 20 for the closing joint of the rim 10. The latch 20 comprises two interlocking members 21 and 22. For purposes of distinguishing the latch members from each other, member 21 is identified as a male member and member 22 as a female member. Each member 21 and 22 has a mounting portion adapted to overlie and to be secured to a terminal segment of the rim 10. The member 21 is secured as by welding to the inner peripheral surface of the terminal segment 15 and the member 22 is secured in like manner to the inner peripheral surface of the last or closing terminal segment 19. Each member 21 and 22 has a portion thereof extending beyond the terminal edge 15′ and 19′ of the particular segment to which it is secured. These members 21 and 22 will now be described in specific detail.

The female member 22 has a mounting portion 23 so constructed as to form a sleeve-like socket 24 with the terminal segment 19 to which it is attached. As best seen in FIG. 5 the member 22 consists of a top or flat plate portion 25 having an open center 26 of rectangular shape so that the plate portion 25 is in the form of a loop L. The mounting portion 23 of the member 22 is channel shaped in that part of the flat plate 25 which overlies the terminal segment 19. The flat plate 25 is a web having downwardly extending flanges 27 along its two sides of the plate 25 to form a recess 24' below the after part of the plate 25. The bottom face 27' of each of these two sided flanges 27 is secured to the terminal segment 19 so that a portion 28 of the segment 19 closes the bottom of the recess 24' formed by the flanges 27 to provide the aforementioned socket 24 with the female member 22. That end of the socket 24 adjacent the terminal edge 19' is open at a location substantially midway the ends of the plate 25 so that approximately one half U of the loop L formed by the plate extends beyond the terminal edge 19' of the segment 19 to overlie the other terminal segment 15.

The male member 21 is a flat plate consisting of a mounting portion 29 having extending therefrom a tongue portion 30 of lesser width than the mounting portion. The tongue portion 30 is of such width as to have sliding fit between the side wall flanges 27 of the female member 22 and the tongue is of such thickness as to fit into the space between the extended end U of the plate 25 and the upper surface of the segment 19 below. The male member 21 further includes an upwardly projecting knob 31 on the top surface of the tongue portion 30 of the mounting portion 29. The knob 31 is of square configuration and of a width to fit between the arms of the extended end U of the open center 26 formed in the loop portion L of the female member 22.

In order to understand the purpose and operation of the present invention an explanation of the use of the curing rim and the stresses and pressures to which it is subjected when associated with a tire being recapped in the mold will now be given.

The curing rim 10 is collapsed or folded together to fit within the orbit defined by the rim bead of a tire into which the curing rim is adapted to be placed. The tire with recap rubber attached is placed in a mold or matrix. A curing bag in deflated condition is within the tire cavity. When the curing rim 10 is opened up each segment 15, 16, 17 and 18 is successively inserted between the rim beads of the tire and the shortest segment 19 is the last to swing toward open, i.e., annular condition as illustrated in FIG. 1. When the last segment 19 is opened up, that portion 28 of the female member covered by the female member 22 overlies the knob 31 and tongue portion 30 of the male member 21 on the segment 15 (see dotted lines FIG. 1 and the perspective detail FIG. 5 of the drawings). In order to close the closing joint the rim 10 must be expanded and the latch members 21 and 22 interrelated preliminary to coming into interlocking relation.

This is accomplished with a manually operated leverage type, rim expanding tool 35 engaging lugs 36 or 37 affixed to the inner peripheral surface of the terminal segment 15 and the after end 38 of the channel shaped mounting portion 23 of the female member 22. This is a well known method of expanding rims to align abutting terminal segments with each other. In the case of the latch means 20 of the present invention the curing rim 10 is expanded by the tool 35 as illustrated in FIGS. 1 and 2. The terminal segments 15 and 19 are thus spread to the position shown in FIG. 1 so that the terminal edge 19' of that portion 28 of segment 19, can pass the fore edge 39 of the male member 21. The segment 19 can now swing into annular alignment with segment 15. However, the extended portion of the loop L must be registered with the knob 31 so that the knob can fit up into the opening 26 formed therein. When the two latch members 21 and 22 are thus interrelated the forward bight 40 of the extended end U of the plate 25 rests upon the top surface of the mounting portion 29 of the member 21 and limits expansion of the rim beyond readiness of the latch members to become interrelated. This assures alignment of the tongue 30 with the socket 24 when the leverage tool 35 is released and the rim 10 allowed to reassume normal or unexpanded condition under its own resiliency. The tongue 30 thereupon slides into the socket 24 to thus secure the terminal segments 15 and 19 in annular alignment as their terminal edges 15' and 19' come into abutting relation with each other.

It should here be noted that the tongue 30 is confined between the plate 25 and part 28 of the segment 19 confined within the side walls or flanges 27 forming the socket 24. Moreover, irrespective of any undue expansion of the rim 10, the tongue 30 is maintained in alignment with the socket 24. As long as the tongue 30 is even slightly within the socket 24 inward collapsing of the rim is prevented.

While the abutting ends of the respective terminal segments 15 and 19 are thus aligned for automatic interlocking relation with each other it will be noted that slight expansion of the rim can occur during inflation of a curing bag. Such expansion does not normally occur in the case of smaller sized tires. However, when larger diametered tires of greater size are being retreaded the larger curing bags used exert greater surface tension against the curing rim. This causes a slight separation or spacing of the abutting ends 15'–19' of the terminal segments into which space a portion of the inflatable curing bag can expand and become pinched. Such pinching can and does puncture the curing bag which results in lack of internal pressure within the tire being molded.

The present invention seeks to overcome the expansion of the rim or opening up of the expansion joint during inflation of a curing bag circumscribing the curing rim. This is accomplished by the provision of a shim ended lever 45 pivotally mounted within the female member 22 for effecting a blocking action behind the knob 37.

The lever 45 is of a width such as to just fit between the inner side walls of the loop L and to be confined partially within the sleeve 24 of the channel shaped mounting portion 23 of the female member 22. The upper face 46 of the lever 45 is normally disposed to lie in the same plane as the upper surface of the loop portion L of the member 22 as best seen in FIGS. 3 and 5. The thickness of the lever 45 is approximately the same as the thickness of the forwardly extending half U of the loop portion L of the member 22. Midway its ends the lever 45 has a pivot boss 47 formed on its underside. A pivot pin 48 extends through the boss 47 and into the adjacent side wall flanges 27 of the channel shaped mounting portion 23. A center slot or groove 49 is formed on the underside of the lever 45 and through the boss 47 to accommodate medial convolutes of a spring 50 mounted on the pivot pin 48. The spring 50 has a pair of arms extending rearwardly from the medial convolutes, one arm 51 bearing against the part 28 of the segment 19 and the other arm 52 bearing against the underside of a handle-like tail portion 53 of the lever 45 for urging the latter clockwise as seen in the several views of the drawing. The tail portion 53 curves inwardly of the loop L from a location above the boss 47 so that the tip end 54 of the tail portion 53 is disposed below the web or upper plate portion of the channel shaped mounting portion. The tip end 54 thus engages the under side of the plate 25 to limit rocking movement of the lever 45 under the influence of the spring 50 in a clockwise direction about the pivotal axis 48.

The underside of the opposite end of the lever 45 is notched out as at 55 to accommodate the knob 31 of the male member 21. This notch 55 is formed between the boss 47 and a shim formation 57 on the underside of the extreme end of the lever 45. This shim formation 57 is such as to latch onto or hook behind the after end 58 of the knob 31 on the male member 21 to thereby latch the two interlocking members against spreading apart. This assures against separating of the abutting ends 15' and 19' of the terminal segments 15 and 19 respectively.

As best seen in FIGS. 1 and 2 the shim formation 57 is automatically removed from blocking engagement with the knob 31 simultaneously with the operation of the wrench 35 while spreading the terminal segments apart. This is accomplished by reason of the engagement of one arm 59 of the wrench 35 with the after end 38 of the channel shaped mounting portion 23 of the female member 22. The tip of the arm 59 engages below and against a rounded bight like margin 60 of the opening 26. This curved margin causes the tip of arm 59 to assume axial center of the opening 26 to thereby assure axial alignment of the arm against the longitudinal axis of the tail portion 53 of lever 45. As a further assurance of this axial centering of the wrench arm 59 relative to the lever 45, the outer surface of the tail which is engaged by the tool 35 has a valley formation 61. The depth of this valley 61 is greatest adjacent the mid-portion of the lever, i.e. where it is first engaged by the tip of the arm 59 of the tool upon insertion of the latter into the opening 26. By the time the tip of the arm 59 has glided down the valley 61 toward the after end of the tail-like handle portion 53 of lever 45 the outer edge of the arm tip is maintained in centered position by the arcuate bight margin 60 of the opening 26.

By removal of the shim formation from within the loop L the knob 31 of the other member 21 can readily enter the loop L during spreading of the terminal ends to initially align them for interlocking relation as best seen in FIGS. 1 and 2.

As soon as the wrench 35 is removed, the curing rim 10 will, under its own resiliency spring back toward closed, annular condition. At this time the shim formation 57 is engaging the top of the knob 31 but as soon as the abutting edges 15' and 19' close upon each other, the lever 45, under the influence of spring 50, will assume its normally closed condition wherein the shim formation 57 snaps into blocking position behind the knob 31.

It should here be noted that the extreme end 65 of the lever 45, adjacent the shim 57, is arcuate shaped on a radius struck from the axis of the pivot pin 48. This assures unobstructed swinging of the lever 45 into and out of its normally closed position. It also affords a tangent bearing of the extreme end 65 of lever 45 against the forward bight 40 of the extended end U of the plate 25. By this tangent bearing any shearing effect upon the pivot pin 48 is minimized.

While I have described my improved securing means for the closing joint of a curing rim in specific detail it will be appreciated by those skilled in the art that the same is susceptible to variations, alterations and/or modifications without departing from the spirit of my invention therein. I therefore desire to avail myself of all variations, alterations and/or modifications as fairly come within the purview of the appended claims.

What I claim as new and desire to protect by Letters Patent is:

1. A latch and tool combination for a pair of aligned, matching, and normally end-abutting rim sections arranged to resist separation, each section having a socket projecting from the back adjacent the abutting end thereof; the latch comprising a tongue fixed on the back of one section between the related socket and the adjacent end of said section, a latch bar on the back and clear of the other section and disposed between the related socket and the adjacent end of said other section and at its end opposite the socket overlying the tongue when the sections are abutted, a lip depending from said end of the bar, said tongue having means to engage the depending lip of the bar for latching relation, and means pivoting the bar intermediate its ends on said other section; the tool comprising a pair of connected members adapted to simultaneously engage the sockets and push the same apart to separate the sections, and means formed with the one member to engage and depress the end of the bar opposite the lip when the tool members are engaged with the sockets whereby to disengage the lip from said tongue lip engaging means.

2. A latch and tool combination for a pair of aligned, matching and normally end-abutting rim sections arranged to resist separation, each section having a socket projecting from the back adjacent the abutting end thereof; the latch comprising a tongue fixed on the back of one section between the related socket and the adjacent end of said section and having a projection thereon extending inwardly of said rim section, a member secured on the back and clear of the other section and disposed between the related socket and the adjacent end of the said other section and having its end opposite the socket overlying the tongue provided with an open loop adapted to receive the projection on said tongue when the sections are abutted, a latch bar having a lip depending from one end thereof and normally projecting through the open loop in said member in latching relation to the projection on said tongue, a mount between said member and the related socket on said other section for pivoting the latch bar intermediate its ends on said section, yieldable means between said mount and said latch for normally urging the lip at one end thereof into latching relation with the projection on said tongue, said latch bar having its opposite end portion nearest the adjacent socket normally spaced from said other section to enable said opposite end portion of said bar to be depressed toward the section a sufficient distance to lift the lip clear of the projection on said tongue; the tool comprising a pair of connected members adapted to simultaneously engage the sockets to push the same apart and separate the sections, and means formed with the member which is engaged with the socket related to said other section to engage and thus depress said opposite end portion of the latch bar upon engagement of said tool member with said socket.

3. A latch and tool combination for the closing joint of a collapsible curing rim in which terminal segments are arranged to be aligned annularly with their terminal ends in abutting relation and resisting separation, each segment having a socket projecting from the back adjacent the abutting end thereof; the latch comprising a male member secured to the back of one of said terminal segments between the related socket and adjacent end of such segment and having a tongue portion extending beyond the terminal end thereof, a female member including a channel shaped portion having its flanges secured to the back of the other one of said terminal segments to provide a sleeve portion at the terminal end of the latter for receiving the tongue portion of said male member, said female member having the web of its channel shaped portion extending beyond the terminal end of said latter segment so as to overlie said male member, said web having an open center of rectangular shape substantially one-half of which provides a U shaped looped end, a knob on said tongue portion adapted to be received within the U shaped looped end of said female member for sliding movement therein and for limiting spreading of said terminal segments beyond interfitting relation of said tongue with the sleeve portion of said female member during expanding of said curing rim, a lever pivotally mounted between the flanges of the channel shaped portion of said female member, a shim formation on one end of said lever normally disposed between the bight end of said U shaped looped end of said female member and said knob on said male member for blocking sliding movement of said knob toward the bight end of said U shaped looped end and for maintaining the terminal ends of said terminal segments in closed abutting relation, the opposite end of said lever being disposed within the related socket of said other one of said terminal segments; the tool comprising a rim wrench consisting of a pair of connected members adapted to simultaneously engage the sockets and to engage the opposite end of said lever to disengage the shim formation of said lever from said knob during spreading of said terminal segments apart.

4. A latch and tool combination for a collapsible curing rim of the type having a closing joint between the terminal edge of terminal segments one of which is swingable toward the other terminal segment, each said terminal and closing segment having a rim wrench engaging lug affixed to the inner peripheral surfaces thereof and adjacent the end of said terminal and closing segments; the latch comprising a male member secured to the inner peripheral surface of said terminal segment and having a tongue portion extending beyond the terminal end thereof, a female member having a channel portion the flanges of which are secured to the inner peripheral surface of said closing segment between the related lug thereon and the terminal end thereof providing a sleeve for receiving said tongue portion, said female member having a U shaped looped end extending beyond the terminal end of said closing segment so as to overlie the male member on said terminal segment, a knob on said tongue portion adapted to be received within the U shaped looped end of said female member for sliding movement therein and for limiting spreading of the closing joint between said segments beyond interfitting relation of the tongue portion on said terminal segment within said sleeve during expanding of said curing rim, a spring urged lever pivotally mounted between the flanges of said channel portion of said female member and having its end portion movable within the U shaped looped end of said female member, a shim on the end portion of said lever and adjacent the bight end of the U shaped looped end of said female member adapted to engage behind said knob on said male member for blocking sliding movement of said knob when the terminal ends of said terminal and closing segments are in closed abutting relation, the tool comprising a rim wrench having a pair of connected arms adapted to simultaneously engage the lugs on said terminal and closing segments to spread the latter apart to facilitate entrance and exit of said tongue portion relative to said sleeve, said lever having a valley formed longitudinally of its opposite end adapted to be engaged by one arm of said rim wrench during expansion of said terminal segments thereby whereby to remove said shim from behind said knob against the action of said spring urged lever.

5. A latch and tool combination for the closing joint between the terminal edge of a terminal segment and that of a closing segment swingable toward the terminal segment of a collapsible curing rim, the terminal segment having a rim wrench engaging lug affixed to its inner back surface; a latch comprising a male member secured to the back surface of said terminal segment between its terminal end and said lug and having a tongue portion extending beyond the terminal end of said terminal segment, a female member having a channel portion the flanges of which are secured to the back surface of said closing segment providing a sleeve for receiving said tongue portion, the channel portion of said female member having a slotted web providing a U shaped looped end extending beyond the terminal end of said closing segment disposed to overlie the male member on said terminal segment, a knob on said tongue portion adapted to be received within the U shaped looped end of said female member for sliding movement therein and for limiting spreading of the closing joint between said segments beyond interfitting relation of the tongue portion on said terminal segment within said sleeve during expanding of said curing rim, and a spring urged lever pivotally mounted between the flanges of said channel portion of said female member and having an end portion movable within the U shaped looped end of said female member, and its opposite end disposed within said channel and beneath the web thereof, a shim on said one end portion of said lever and adjacent the bight end of the U shaped looped end of said female member adapted to engage said knob on said male member to thereby block sliding movement of said knob when the terminal ends of said terminal and closing segments are in closed abutting relation, the tool comprising a rim wrench having a pair of connected members adapted to simultaneously engage said lug and the web of said channel portion to push the same apart and separate the terminal and closing segments, said slotted web having an arcuate margin above said lever engageable by one member of said rim wrench for centering the same relative to said lever, and a valley formed on the said opposite end of said lever engageable by said one member of said rim wrench for guiding the latter and depressing said lever against the action of its spring and for withdrawing said shim on the said one end portion of said lever from behind said knob during expanding of said rim by said rim wrench.

References Cited by the Examiner
UNITED STATES PATENTS

| | | | |
|---|---|---|---|
| 2,904,347 | 9/1959 | Tucker | 24—230.1 XR |
| 2,933,795 | 4/1960 | Meeker | 24—230.1 XR |
| 2,985,917 | 5/1961 | Sunday | 18—43 |

J. SPENCER OVERHOLSER, *Primary Examiner.*

WILLIAM J. STEPHENSON, J. HOWARD FLINT, JR., MICHAEL V. BRINDISI, *Examiners.*